United States Patent [19]

Walker

[11] 4,061,958
[45] Dec. 6, 1977

[54] CONSTANT POWER RATING POWER SUPPLY

[75] Inventor: William T. Walker, Summit, N.J.

[73] Assignee: Hewlett-Packard Co., Palo Alto, Calif.

[21] Appl. No.: 676,849

[22] Filed: Apr. 14, 1976

[51] Int. Cl.² .......................................... H02M 7/00
[52] U.S. Cl. ............................. 363/81; 323/43.5 S; 363/128; 363/126
[58] Field of Search ........................ 321/18, 19, 47; 323/43.5 R, 43.5 S

[56] References Cited

U.S. PATENT DOCUMENTS

| | | | |
|---|---|---|---|
| 3,195,036 | 7/1965 | McNulty et al. | 323/43.5 S X |
| 3,356,928 | 12/1967 | Parrish | 321/18 |
| 3,470,452 | 9/1969 | Watson | 323/43.5 S X |
| 3,538,418 | 11/1970 | Allington | 323/22 T X |
| 3,581,187 | 5/1971 | Grady, Jr. | 323/22 T X |
| 3,921,059 | 11/1975 | Birman et al. | 321/18 X |

*Primary Examiner*—William M. Shoop

[57] ABSTRACT

The amplitude of the rectified voltage applied to the filter capacitor of a power supply is varied by selecting different taps in the secondary winding as a function of the output voltage and current so that the supply provides a wide range of operating voltages and currents in a minimum volume and at reduced cost.

20 Claims, 7 Drawing Figures

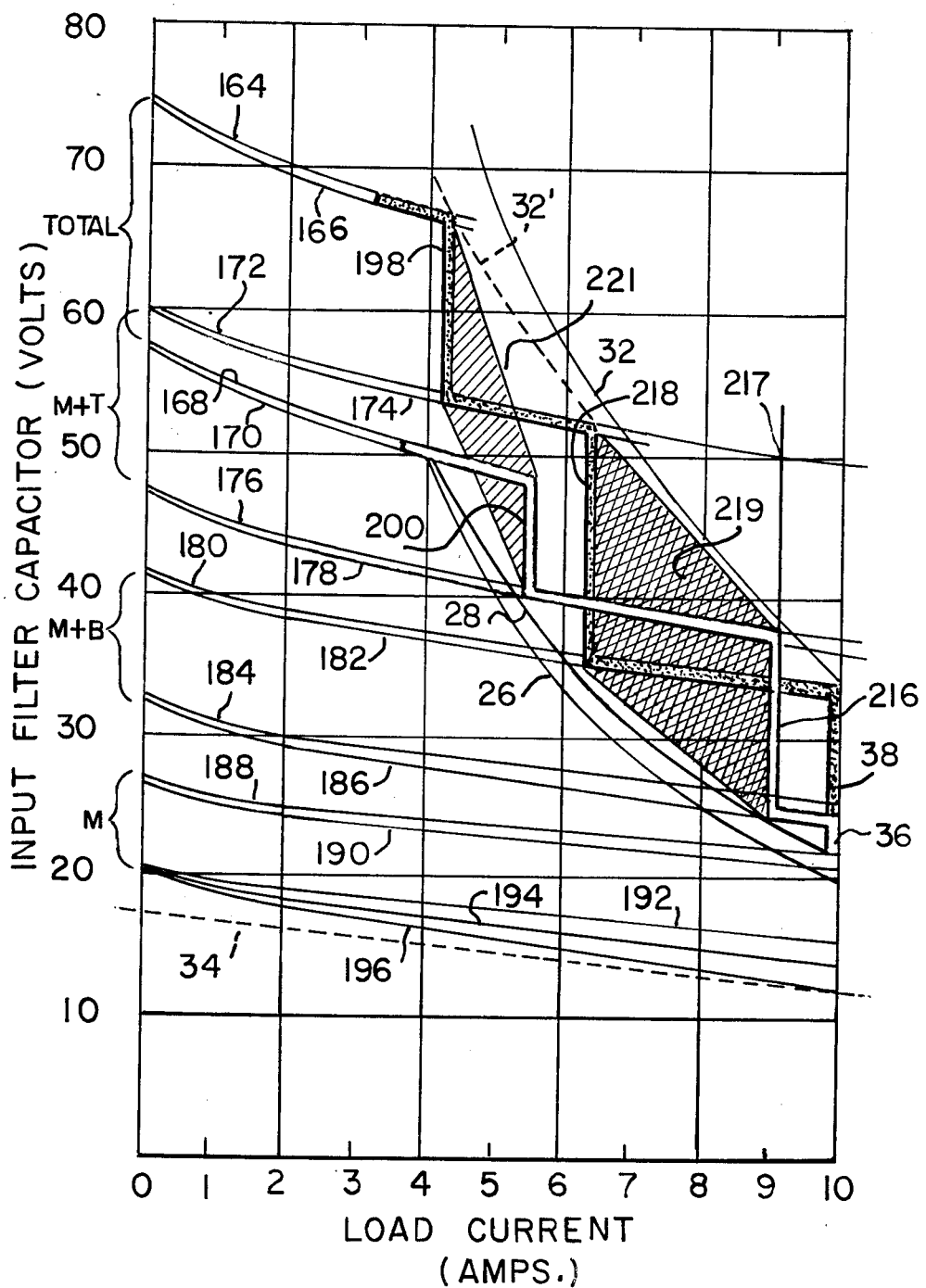

CONSTANT POWER RATING POWER SUPPLY

BACKGROUND OF THE INVENTION

This invention relates to apparatus for supplying controlled amplitudes of direct current voltage or current from a line of alternating current voltage. Such a power supply is generally comprised of a power transformer for providing a desired amplitude of alternating current voltage, a rectifier for converting this alternating current voltage to a direct current voltage that is applied to a filter or storage capacitor, and a regulator for maintaining the output voltage or current at selected values. In order to dissipate the heat generated in the regulator, a heat sink is required.

A basic power supply such as this is capable of providing any voltage up to its rated maximum $V_r$, in combination with any current up to the rated maximum $I_r$. The rated power output $V_r I_r$ occurs only at one point $V_r$, $I_r$. In practice it is often required that a supply operate up to relatively large values of voltage and current. However, not all combinations of voltage and current up to $V_r$ and $I_r$ are generally required. It is more important to supply a large voltage at a low current and a large current at a low voltage. This means that the power output can be much less than $V_r I_r$.

Various power supplies have been built that selectively provide different combinations of maximum voltage $V_r$ and maximum current $I_r$, in which the power output for each combination is less than the largest $V_r$ times the largest $I_r$. Whereas some advantage in cost and size is thereby derived, separate filter capacitors and completely separate secondary windings of the power transformer are used so that bulk and cost are still a problem.

SUMMARY OF THE INVENTION

Briefly, in accordance with one aspect of this invention, the turns ratio of the power transformer is reduced whenever the load current reaches values that might cause the rate of heat production in the regulator to exceed the heat dissipation capacity of the heat sink. This permits the heat losses in the transformer due to $I^2R$ to be maintained at a nearly constant level, thereby permitting the size and cost of the transformer to be optimized.

In accordance with another aspect of this invention, the voltage output at which the supply can be rated is increased by varying the value of load current at which the change in turns ratio is effected as a function of the line voltage.

Although changing the turns ratio of the transformer at certain values of load current permits reduction in the size and cost of the power transformer, the size and cost of the heat sink can be significantly reduced by maintaining the turns ratio of the transformer at a minimum value until the output voltage is above a given threshold value. When this occurs, there is a known amount of power being dissipated in the load that does not have to be dissipated by the heat sink and therefore its size and cost can be reduced.

A power supply utilizing the control circuits of this invention is capable of rapid adjustment to changing conditions because the turns ratio can be changed once during each half cycle of the line voltage.

BRIEF DESCRIPTION OF THE DRAWINGS

FIG. 2 is a graphical representation of the operating characteristics of a power supply constructed as shown in FIGS. 1A and 1B and FIGS. 3A and 3B.

DESCRIPTION OF AN EMBODIMENT OF THE INVENTION

Figure 1A:
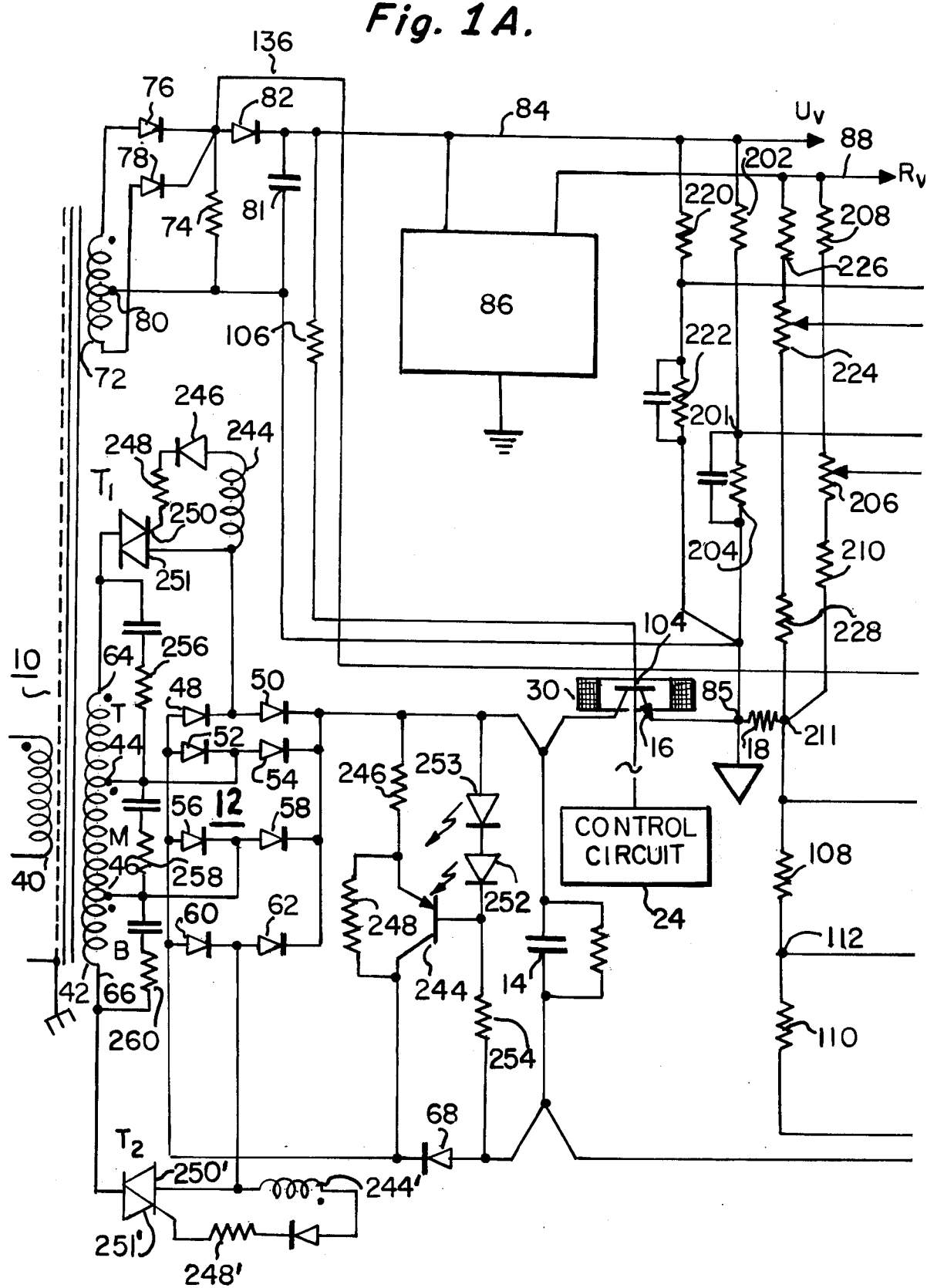
FIGS. 1A and 1B show a power supply in which the turns ratio of the power transformer can be changed at two different levels of load current and one level of load voltage. The traic switches which determine the turns ratio are fired under the control of a one shot multivibrator.
Figure 1B:
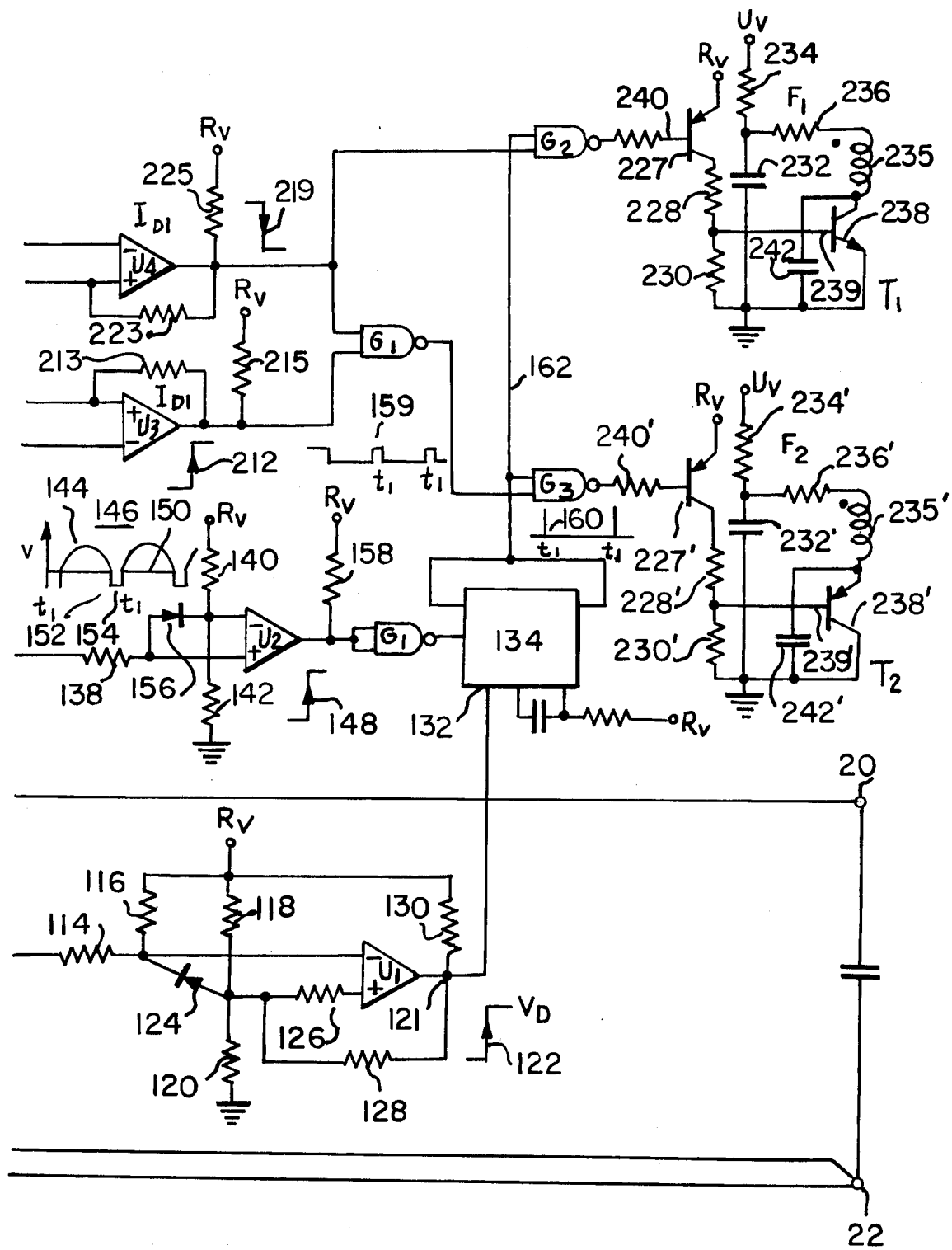

The basic elements of a power supply shown in FIGS. 1A and 1B are a power transformer 10, rectifying means 12, a filter capacitor 14, a series regulator 16, a current monitor resistor 18, output terminals 20, 22 and the usual control circuits 24 for applying a voltage to the regulator 16 so as to provide constant voltage or constant current operation at preset values.

FIG. 2 is a graphic illustration of the actual voltage and current relationships at various points in a circuit constructed in accordance with the invention. The rated output of the supply is shown in curve 26. A maximum output voltage of 50 volts can be maintained until a current of 4 amperes is reached. From this point the output follows a constant power hyperbola (VI = K) of 200 watts until a maximum output current of 10 amperes is reached at a voltage of 20 volts.

In order to produce the rated voltage, the average voltage across the filter capacitor 14 has to be at least somewhat greater, as illustrated by the curve 28, in order to allow for the saturation voltage drops across the regulator 16, the current monitoring resistor 18 and also for the instantaneous minimum values of the ripple voltage that is produced across the capacitor 14 as it is charged through the rectifier 12 and discharged by a load connected to the output terminals 20, 22.

As is customary, a heat sink 30 is provided which must be capable of dissipating the heat generated in the regulator 16 under the worst conditions, i.e., when a short circuit occurs across the output terminals 20, 22 at a time when the power line voltage supplied to the transformer 10 is high. When translated into watts the effective dissipation capability of the heat sink can be represented by a hyperbola 32. It is greater than rated output power of the supply, as represented by the curve 26 because the former is determined under high line conditions and the latter under low line conditions.

In accordance with the invention, the voltage supplied to charge the capacitor 14 is changed as a function of output current and line voltage, and, in accordance with an improved form of the invention, it is changed as a function of the output voltage as well. It is the latter arrangement that is shown in FIGS. 1A, 1B and FIGS. 3A, 3B and illustrated by the curves of FIG. 2. In any case, it is necessary that the average voltage across the capacitor 14 always be above the curve 28 in order to insure the supply of the rated voltage at low line voltage but below the heat dissipation curve 32 in order not to damage the regulator 16 by exceeding the heat dissipation capability of the heat sink 30 associated with it.

With these limitaions in mind, let us consider the overall operation of the power supplies of FIGS. 1A, 1B and FIGS. 3A, 3B as illustrated by the graphs of FIG. 2 before considering the details of the means for providing such operation. When the output voltage is less than the voltage represented by the sloping line 34, the voltage applied to the capacitor 14 is held to a minimum value regardless of the load current present. However, once the output voltage exceeds that of line 34, the voltage applied to the capacitor 14 is increased to a medium low value and from that point on is still further increased as the load current decreases. The clear step wave 36 illustrates the operation at the lowest line voltage. When the output current reaches about 9.1 amperes the voltage is stepped up to a medium high value, and when the current further decreases to about 5.6 amperes, the voltage is stepped up to its highest value. The stippled step wave 38 illustrates the operation under high voltage power line conditions. In this case, however, the step increases in voltage occur at lower currents, e.g., at 6.2 amperes instead of 9.1 and at 4.2 amperes instead of 5.6. Notice, however, that the lowest corners of both waves are above the curve 28 and that the highest corners are below the curve 32.

The power supply illustrated in FIGS. 1A and 1B can be conveniently divided into two parts for purposes of explanation, the means that actually changes the voltage applied to the filter capacitor and the circuits for controlling that means.

The voltage changing means involves the power transformer 10 and the rectifier 12. The power transformer 10 has a primary winding 40 and a secondary winding 42. The latter is divided by intermediate taps 44 and 46 into a middle section M having 29 turns, a top section T having 35 turns, and a bottom section B having 16 turns. The rectifier 12 is comprised of a plurality of pairs of serially connected diodes 48, 50; 52, 54; 56, 58 and 60, 62 connected in series parallel relationship in like polarity. The tap 44 is connected to the junction of the diodes 52, 54 and the tap 46 is connected to the junction of the diodes 56, 58. A triac $T_1$ couples the upper end 64 of the secondary winding to the junction of the diodes 48, 50, and a triac $T_2$ connects the bottom end 66 secondary winding to the junction of the diodes 60, 62. The filter or storage capacitor 14 is connected in parallel with the diode pairs 48–62.

When neither triac $T_1$ or $T_2$ is conducting, only the middle portion M of the secondary winding 42 is active and the diodes 52, 54, 56 and 58 form a full wave rectifier for applying a direct current charging voltage to the filter capacitor 14. If the triac $T_1$ is conducting and the triac $T_2$ is not conducting, the combined voltage supplied by the middle and top portions, M and T, of the secondary winding is rectified. During the positive half cycle current passes from the point 64 through the diode 50, the capacitor 14, a diode 68, the purpose of which will be subsequently explained, the diode 56 and back to the secondary winding at the tap 46 via the connection between it and the junction of the diodes 56, 58. All the other diodes are biased beyond cut-off. During a negative half cycle the current flows in from the tap 46 through the diode 58, the capacitor 14, diode 68, diode 48 and back to the secondary winding through the triac $T_1$.

Similar analysis shows that when the triac $T_2$ is conducting, full wave rectification is provided for the voltage appearing across the middle portion M and the bottom portion B and that if both triac $T_1$ and $T_2$ are conducting full wave rectification is provided for the voltage across the entire secondary winding.

These facts are summarized in the following table:

| Triacs Conducting | Diodes Conducting | Active Transformer Turns |
|---|---|---|
| Neither | 52,54,56,58,68 | M |
| $T_1$ | 48,50,56,58,68 | M+T |
| $T_2$ | 52,54,60,62,68 | M+B |
| Both | 48,50,60,62,68 | M+B+T |

The circuits for controlling the operation of the triacs $T_1$ and $T_2$ require an unregulated supply of about 20 volts to give an indication of the level of the line voltage and a well regulated supply of about 5 volts to serve as a reference. A tertiary winding 72 of the power transformer 10 has its opposite ends connected to one end of a load resistor 74 by diodes 76 and 78, the other end of the resistor being connected to a center tap 80 so as to provide a fully rectified voltage wave across the resistor 74. A series combination of a filter capacitor 81 and an isolating diode 82 is connected in parallel with the resistor 74. The junction between the capacitor 80 and the diode 82 is connected to a bus 84 of unregulated voltage, and the other side of the capacitor 80 is connected to the input side 85 of the current monitoring resistor 18 that serves as ground for the control system. The base 104 of the series regulator transistor 16 is connected via a resistor 106 to the bus 84 of unregulated voltage. This arrangement prevents the series regulator base drive current from flowing through the current monitoring resistor and upsetting accurate programming of constant current. After all it is the voltage drop across the resistor 18 that is used as an indication of the amount of current flowing. Highly regulated bias voltage $R_r$ is derived from the unregulated voltage bus 84 by any suitable means such as 86. Although not shown, the voltage $R_r$ is to be applied to all the integrated circuits to be mentioned.

Before either triac $T_1$ or $T_2$ is to fire the voltage at the output terminals 20, 22 must be above the dotted line 34 of FIG. 2. With the particular circuits illustrated this result is achieved by a voltage comparator $U_1$ that produces a low output voltage when the output voltage is below the voltage decision line 34 and a high voltage when it is above. Resistors 108 and 110 are connected in series across the output terminals 20, 22 and are so proportioned that only about 10% of the output voltage appears across the resistor 108.

The junction 112 of these resistors is connected by a resistor 114 to an inverting terminal of an operational amplifier $U_1$, and the inverting terminal is connected by a resistor 116 to the bus 88 which supplies a well regulated reference voltage $R_r$. The noninverting terminal is biased by a connection to the junction of two resistors, 118 and 120, that are connected in series between the bus 88 of regulated voltage and the control circuit ground 85. These biases are so chosen that with no load current the output 121 of the operational amplifier $U_1$ is in a low state until the output voltage of the supply at 20, 22 reaches a value of about 17 volts, at which point the output of the operational amplifier changes to a high state as indicated at 122. Load current drawn through the current monitoring resistor 18 produces a voltage of such polarity as to add to the output voltage across the resistor 108 so that as the load current increases, the output voltage required to cause the $U_1$ to change its state become less.

A diode 124 is connected between the junction of the resistor 114, 116 and the junction between the resistor 118, 120 so as to provide a clamping action when the output voltage is much more than the line 34, thereby protecting the inputs of $U_1$. A resistor 126 is connected between the junction of the resistors 118, 120 and the positive input of $U_1$ in order to equalize the impedances seen by the inputs. Hysteresis is provided by a resistor 128 connected between the junction of the resistors 118, 120 and the output 121 so that if the voltage output at the terminals 20, 22 is equal to the voltage of line 34, $U_1$ will not constantly change state. A pullup resistor 130 interfaces the direct current voltage at the output 121 of $U_1$, with the input 132 of a monostable multivibrator 134 in the form of an integrated circuit type 4098 to which it is applied. For reasons that will be subsequently explained, if the output 121 is in a low state neither triac $T_1$ or triac $T_2$ can be fired, but if it is in a high state, either or both may be fired depending on the value of the load current.

Inasmuch as the load current and voltage can change rapidly, even during a half cycle of the line voltage, it is desirable to fire the triac combination determined by the voltage and current conditions prevailing during only a brief period of time. In order that the selected sections of the power transformer secondary be active for as long as possible, the triacs should be fired close to the beginning of each half cycle. This is accomplished by coupling the fully rectified but unfiltered voltage wave appearing across the resistor 74 to the noninverting input of an operational amplifier $U_2$ via a lead 136 and a resistor 138 and by biasing the negative input of $U_2$ with a connection to the junction of resistors 140 and 142 that are in series between the reference voltage bus $R_v$ 88 and ground for the control system. The voltage wave applied to the noninverting input is as illustrated by the curve 144 in the graphical representation 146. When it exceeds the bias applied to the inverting input the output of the $U_2$ goes from a low to a high state as indicated by the arrow 148, and, of course, when it is less than this bias the output of $U_2$ drops back to a low state. Hence the output of $U_2$ is as illustrated by the square wave 150 having a negative portion 152 straddling the cusps 154. The output at $U_2$ changes from a low to a high state of times $t_1$. With higher line voltage $t_1$ occurs earlier. Diode 156 is connected between the inputs of $U_2$ so as to clamp the input wave 144 to $U_2$ whenever it is greater than the voltage at the junction of the resistors 140 and 142. A pullup resistor 158 is connected between the output of $U_2$ and the reference voltage $R_v$ on the bus 88. Both inputs of a NAND gate $G_1$ are connected to the output of $U_2$ so that it operates as an inverter and supplies a wave 159 having a polarity opposite to that of the wave 150 to a negative going edge sensitive trigger input to the multivibrator 134. The multivibrator 134 is capable of responding to the negative going trailing edges occurring at times $t_1$ and provides at its output a positive pulse. However, the multivibrator 134 ANDS the low state input of the wave 159 occurring at times $t_1$ with the high state of the voltage decision circuit $V_d$ as indicated at 122 so as to produce a positive pulse 160 at times $t_1$ at the output lead 162. Hence, the timing of the pulse 160 is determined by the zero crossover circuit associated with $U_2$, but they are not produced at all if the output voltage at the terminals 20, 22 is not in excess of the voltage decision line 34 of FIG. 1 as determined by the voltage decision circuits associated with $U_1$. Such pulses play a part in turning on the triacs $T_1$ and $T_2$ and the circuitry for accomplishing it will be explained after the following discussion of means for producing signals that can be used to select the combination of the triacs $T_1$ and $T_2$ that are to be fired as the load current and voltage vary.

For a clear understanding of this operation and the reasons for it, reference is again made to the graphs of FIG. 2. The pairs of closely spaced curves that slope downwardly to the right represent the decreasing voltages supplied by the various combinations of the segments of the secondary winding 42 of the power transformer 10 as an increase in the load current causes increasing IR drops in the windings. In each pair the top curve represents the average voltage across the filter capacitor 14, and the bottom curve represents the voltage across the filter capacitor 14 at the instantaneous minimum of the ripple voltage or valley voltage. The pair of curves intersecting the tops of the brackets M+T+B, M+T, M+B, and M represent these current-voltage relationships for each of four winding combinations when the power line is at its highest specified voltage and the pair of curves intersecting the bottom of the brackets represent these current-voltage relationships for the same winding combination when the line voltage is at its minimum specified voltage. Although shown as thick lines in order to make them easier to follow, the step waves 36 and 38 that actually exist are the bottom edges of each. The numbers for the various curves are indicated in the following table of voltage across the filter capacitor 14.

| Winding | Curve No. | Designation | | | |
|---|---|---|---|---|---|
| Total = M+B+T | 164 | high | line | average | voltage |
| " | 166 | " | " | valley | " |
| " | 168 | low | " | average | " |
| " | 170 | " | " | valley | " |
| M+T | 172 | high | line | average | voltage |
| " | 174 | " | " | valley | " |
| " | 176 | low | " | average | " |
| " | 178 | " | " | valley | " |
| M+B | 180 | high | line | average | voltage |
| " | 182 | " | " | valley | " |
| " | 184 | low | " | average | " |
| " | 186 | " | " | valley | " |
| M | 188 | high | line | average | voltage |
| " | 190 | " | " | valley | " |
| " | 192 | low | " | average | " |
| " | 194 | " | " | valley | " |
| " | 196 | valley voltage minimum minus voltage drop in regulator 16 and resistor R18 | | | |

The function of the current decision circuit $I_{d1}$ is to provide a signal that can be used to control the firing of both triacs $T_1$ and $T_2$ so to render all secondary windings as active, or the firing of $T_1$ so as to render the middle and top winding segments active alone depending on whether the load current is less or greater than a predetermined value that increases from the current of about 4.2 amperes indicated by the vertical section 198 of the high voltage operation step wave 36 to a value of about 5.5 amperes, as indicated by a vertical section 200 of the low voltage operation step wave 38.

The $I_{d1}$ circuit is comprised of an operational amplifier $U_3$ having its noninverting input connected to a junction 201 between resistors 202 and 204 that are connected in series between the unregulated voltage bus 84 and the ground for the control circuits that is indicated at the input of the current monitoring resistor 18. The inverting input terminal of $U_3$ is connected to a tap of a potentiometer 206 that is connected in series with resistors 208 and 210 between the bus 88 of regulated voltage $R_v$ and the output side 211 of the current monitoring resistor 18.

If the line voltage decreases, the unregulated voltage on the bus 84 decreases thus lowering the positive potential on the noninverting input of $U_3$. Accordingly, it will take more load current through the monitoring resistor 18 to make the inverting input of $U_3$ have the same potential so as to cause $U_3$ to change the state of the output as indicated at 212. It is apparent that the absolute values of load current and line voltage at which $U_3$ changes the level of its output can be adjusted to desired values by suitable selection of the value of resistance of the various resistors. The resistor 213 connected between the output terminal of $U_3$ and its noninverting input terminal provides hysteresis, and a resistor 215 is a pullup resistor connected between the output of $U_3$ and the bus 88 of regulated voltage $R_v$.

The function of the current decision circuit $I_{d2}$ is to provide a signal that can be used to control the firing of the triac $T_1$, so as to render the middle and top segments of the secondary winding active or to control the firing of the triac $T_2$, so as to render the middle and bottom segments of the secondary winding active depending on whether the load current is less or greater than a predetermined value that increases from a current of about 6.3 amperes, indicated by the vertical section 218 of the high voltage operation step wave 38 to a value of about 9.2 amperes, as indicated by the vertical section 216 of the low voltage operation step wave 38.

In the circuit $I_{d2}$ the output signal of an operational amplifier $U_4$ is caused to go from a high state to a low state, as indicated at 219, whenever the output current increases through a current decision point. The inverting input of $U_4$ is connected to the junction between resistors 220 and 222 that are connected in series between the bus 84 of unregulated voltage and the control circuit ground, and the noninverting input is connected to a tap on a potentiometer 224 that is connected in series between the bus 88 of regulated voltage and the output side 211 of the current monitoring resistor 18. A resistor 223 connected between the output terminal of $U_4$ and its noninverting input terminal provides hysteresis and a pullup resistor 225 is connected between the output terminal of $U_4$ and the bus 88 of regulated voltage $R_v$.

The firing circuits $F_1$ and $F_2$ for the triacs $T_1$ and $T_2$ are identical so that corresponding components will be indicated by the same numbers, but in the case of $F_2$, the numbers are primed. The emitter of PNP transistor 227 is connected to the bus 88 of regulated voltage $R_v$, its collector is connected to control circuit ground via two series resistors 228 and 230. A capacitor 232 is connected in series with a charging resistor 234 between a control circuit ground and the bus 84 of unregulated voltage $U_r$. A primary winding 235 of a pulse transformer is connected in series with a current limiting resistor 236 and the collector-emitter path of an NPN transistor 238 between control circuit ground and the junction between the capacitor 232 and the resistor 234. The base electrode 239 is connected to the junction of the resistors 228 and 230. In operation the capacitor 232 is charged up to the potential $U_r$. If a sufficiently negative-going voltage is applied to the base electrode 240 of the transistor 227, it conducts, producing a positive voltage at the junction of the resistors 228 and 230 which is applied to the base electrode 239 of the transistor 238 causing it to go into saturation and quickly discharge the capacitor 232 through the pulse transformer primary winding 234. A capacitor 242 resonates with the inductance of the primary winding 234 when the transistor ceases to conduct so as to reset the core of the pulse transformer.

The discharge of the capacitor 232 through the primary winding 234 of the pulse transformer induces a pulse of voltage in the secondary winding 244 that is connected in series with a diode 246 and a current limiting resistor 248 between the main electrode 251 of the triac $T_1$ and its gate 250. This pulse is timed by the pulses 160 at the output of the multivibrator 134 so that the pulse occurs early, if at all, in each half cycle of the line voltage. In order for the triac $T_1$ to conduct for most of the half cycle of line voltage, it must be conducting when the firing pulse terminates, but this is generally not the case because current normally flows into the filter capacitor only during a small part of the half cycle near its center.

For this reason, a current sink is provided in the form of a transistor 244 having its emitter collector path connected in series with a resistor 246, the series combination being in parallel with the diode pairs 48–62. A resistor 248 may be connected in shunt with the transistor 244 to bypass some of the current. Two LEDs (light emitter diodes) 252 and 253 and a resistor 254 are connected in series parallel with the filter capacitor 14. When the power supply is connected to the line, the middle section M of the power transformer secondary is active. It charges capacitor 14 which causes current to flow through the diodes 252, 253 and the resistor 254 so as to provide a base bias for the transistor 244. The triacs $T_1$ and $T_2$ cannot be fired, however, until the transformer 10 supplies enough voltage to support the latch sink keep alive voltage, as well as the voltage across the triacs $T_1$ and $T_2$. The pulse supplied by the pulse transformer secondary 244 must occur after this point has been reached. It is important to note that the capacitor 14 can not discharge through the current sink because of the diode 68. Snubber networks 256, 258 and 260, each comprised of a capacitor in series with a resistor, are connected in shunt with each of the winding segments, M, B, and T so as to limit the rate of change of voltage across the triacs $T_1$ and $T_2$ and minimize the radio frequency interference that might be generated by diode commutation.

Logic Circuits

The outputs of $I_{d1}$ and $I_{d2}$ are applied to separate inputs of a NAND gate $G_1$. The output of $I_{d2}$ is also applied to one input of a NAND gate $G_2$ and the output of $G_1$ is applied to NAND gate $G_3$. The output of the multivibrator 134 is applied to the other inputs of both $G_2$ and $G_3$.

Overall Operation and Logic Circuits

If the output voltage of the supply is below the voltage decision line 34 of FIG. 2, the multivibrator 134 will not produce any pulses 160 for reasons previously explained. Under this condition neither triac $T_1$ nor $T_2$ should be fired and the only active section of secondary winding 42 should be the middle section M. For either triac to fire a negative output would be required from either $G_2$ or $G_3$, and this requires both inputs to be positive. The fact that one input of each gate, receives a negative signal from 134, means that the output of both are positive so that neither triac is fired.

Now, if the output voltage should rise above the threshold represented by the line 34 of FIG. 2 and if the load current is near a maximum, it is desired that the segments M and B of the secondary 42 be active, and to achieve this triac $T_2$ should be fired. Positive output pulses 160 are applied to one input of $G_2$ and $G_3$. As the output current is greater than any current decision level, even bigger than the highest one indicated by the vertical line section 216, the output of $I_{d2}$ will be negative and the output of $I_{d1}$ is positive. The negative signal of $I_{d2}$ at one input to $G_2$ and the positive signal pulse 160 at the other cause $G_2$ to put out a positive signal so that $T_1$ will not be fired. The application of the positive signal from $I_{d1}$ and the negative signal from $I_{d2}$ to the input of $G_1$ causes it to deliver a positive signal to one input of $G_3$, and because the positive pulses 160 are also applied to the other input of $G_3$ it will put out a negative signal that is required to fire the triac $T_2$ in a manner just explained.

Now, suppose the output current decreases so that it is less than the current of decision level of $I_{d2}$ under the prevailing line voltage level, but greater than the current decision level $I_{d1}$. Under this condition it is required that the triac $T_1$ be fired. The output of $I_{d2}$ is positive and so are the pulses 160 so that $G_2$ puts out a negative signal and triac $T_1$ is fired. With the output of $I_{d2}$ positive and $I_{d1}$ also positive, the output of $G_1$ is negative so that $G_3$ puts out a positive signal and $T_2$ will not be fired.

If the output current further decreases so that it is less than the current decision level $I_{d1}$ for the prevailing line voltage, it is desired that both triacs $T_1$ and $T_2$ be fired. The output of $I_{d2}$ is positive so that it in combination with the positive pulses 160, causes $G_2$ to put out the negative signal required to fire $T_1$. The positive signal from $I_{d2}$ and the negative signal from $I_{d1}$ causes $G_1$ to put out a positive pulse at an input to $G_3$. The positive signal 160 at the other input of $G_3$ causes it to put out the negative signal required to fire the triac $T_2$. Thus, both triacs $T_1$ and $T_2$ are fired as intended.

It will be apparent to one skilled in the art that other logic circuits could be used which might require signals from the $I_{d1}$, $I_{d2}$ and $V_d$ and the zero crossover circuits that have different combinations of polarities than the ones shown.

The outputs of $I_{d1}$ and $I_{d2}$ may vary rapidly, even during the same half cycle of line voltage, but the only values that have any effect are those that occur at the time of the positive pulses 160 furnished by the multivibrator 134.

The selection of the current decision values of $I_{d2}$ and $I_{d1}$ and the relationship between the number of turns in the various winding segments M, B and T is such as to permit the power supply to deliver its rated maximum power under low voltage conditions and yet not exceed the heat sink capability under high voltage conditions.

Assume that the operating point is on the low voltage curve 36 at a current slightly greater than $I_{d2}$ at the vertical line 216. The middle and bottom segments M and B of the secondary 46 are active. If the load current decreases to the $I_{d2}$ line 216, the circuits operate to make the middle and top winding segments M and T active. If this did not occur and the current kept decreasing, the power output would go below 200 watts in this particular supply, as illustrated by the curves of FIG. 2. The number of turns on the top section T is just enough to bring the voltage up to a point at the upper end of line 216 that is just below the heat sink dissipation curve 32.

Remembering that the step wave is for low line voltage operation, it can be seen if the current decision point $I_{d2}$ were kept at the same value, i.e, at the value of the line 216 that even a slight increase in voltage would cause the operation point to be above the curve 32. In fact, if the line voltage increased to its maximum value, the switching to the winding segments M+T would cause the operation point to be at the point 217, where the vertical line 216 would intersect the nearly horizontal lines 172.

Therefore, as the line voltage increases the current decision point $I_{d2}$ occurs at a lower current so that the change to the higher voltage produced by the segments M+T also occur at a lower current. If the line voltage increases to its maximum, $I_{d2}$ moves to the line 218. The bottom of the line 218 is at the high voltage line 180 for the M+B segments and the top is at the high voltage line 172 for the M+T segments. Once again, if the load current is decreased further, the output power would be less than the rated value of 200 watts and if the number of turns were too great, the operating point would go above the curve 32.

The operating point is in the intersection of the load current and the voltage regulation curve for the particular winding segments that are active and, therefore, can be anywhere within the shaded area 219. A similar analysis applies with respect to the current decision value of $I_{d1}$. It can occur anywhere within the shaded area 221.

A major advantage of this invention is that the design of the transformer can be optimized over a wide operating range because the maximum $I^2R$ losses for each combination of winding segments is nearly the same.

Another major advantage of this power supply is that the heat dissipation capacity and therefore the size and cost of the heat sink 30 can be significantly reduced. The principle reason for this is the use of the voltage decision circuit $V_d$ that prevents segments of the secondary winding 42, other than the middle one, M, from being activated until the output voltage reaches a value on current 34 of FIG. 3. At this point, it is known that a certain amount of power may be delivered to the load so that the heat sink capacity can be reduced by that amount. For example, at a value of 12 volts, the point where the dotted line 34 intersects the 10 ampere line, 120 watts are delivered to the load so that the heat sink capacity can be reduced by that amount. In this way a heat sink with a capacity of dissipating only 230 watts can be used in a power supply rated to deliver 200 watts. Without the voltage decision operation the heat sink would be required to dissipate 350 watts at the point where the dissipation curve 32 of FIG. 2 crosses the 35 volt line and the 10 ampere line. The curve 32 as plotted is actually at 350 watts, but the heat sink capacity need only be the difference between it and the watts represented by the voltage decision line 34 or 230 watts.

The fact that the voltage decision line 34 is sloped so as to increase in voltage as the current diminishes offers the advantage of providing more design freedom. Inasmuch as the curve 32 represents the effective heat sink capacity relative to the line 34 the entire curve 32 can be rotated upwardly about the point where it intersects the 10 ampere line. If the voltage decision line 34 were not sloped, the curve 32 would be shown by the dotted line in curve 32', a situation which would cause some possible points of operation to be outside it and, therefore, beyond the heat sink capacity. Whereas it is true that the danger could be eliminated by suitable design changes, it can be seen that the sloping of the voltage decision curve 34 offers a definite advantage.

In conclusion, it can be seen that the power transformer 10, rectifier 12 and the triacs $T_1$ and $T_2$ form one means for controllably varying the direct current voltage applied to the filter capacitor 14; that each current decision circuit $I_{d1}$ or $I_{d2}$ is a means for providing a change in its output signal when the output current passes through a predetermined value and that these circuits include means for changing the said predetermined value of output current with line voltage variation; that the voltage decision circuit $V_d$ is one means for providing a change in its output signal whenever the output voltage passes through a predetermined value and that it can include means for decreasing the predetermined value as the output current increases; further that the zero crossover circuit in combination with the multivibrator 134 is a means for selecting values of the output current and voltage occurring for a brief portion of each cycle that are to be used for varying the direct current voltage applied to the filter capacitor.

Preferred Embodiment

Figure 3A:
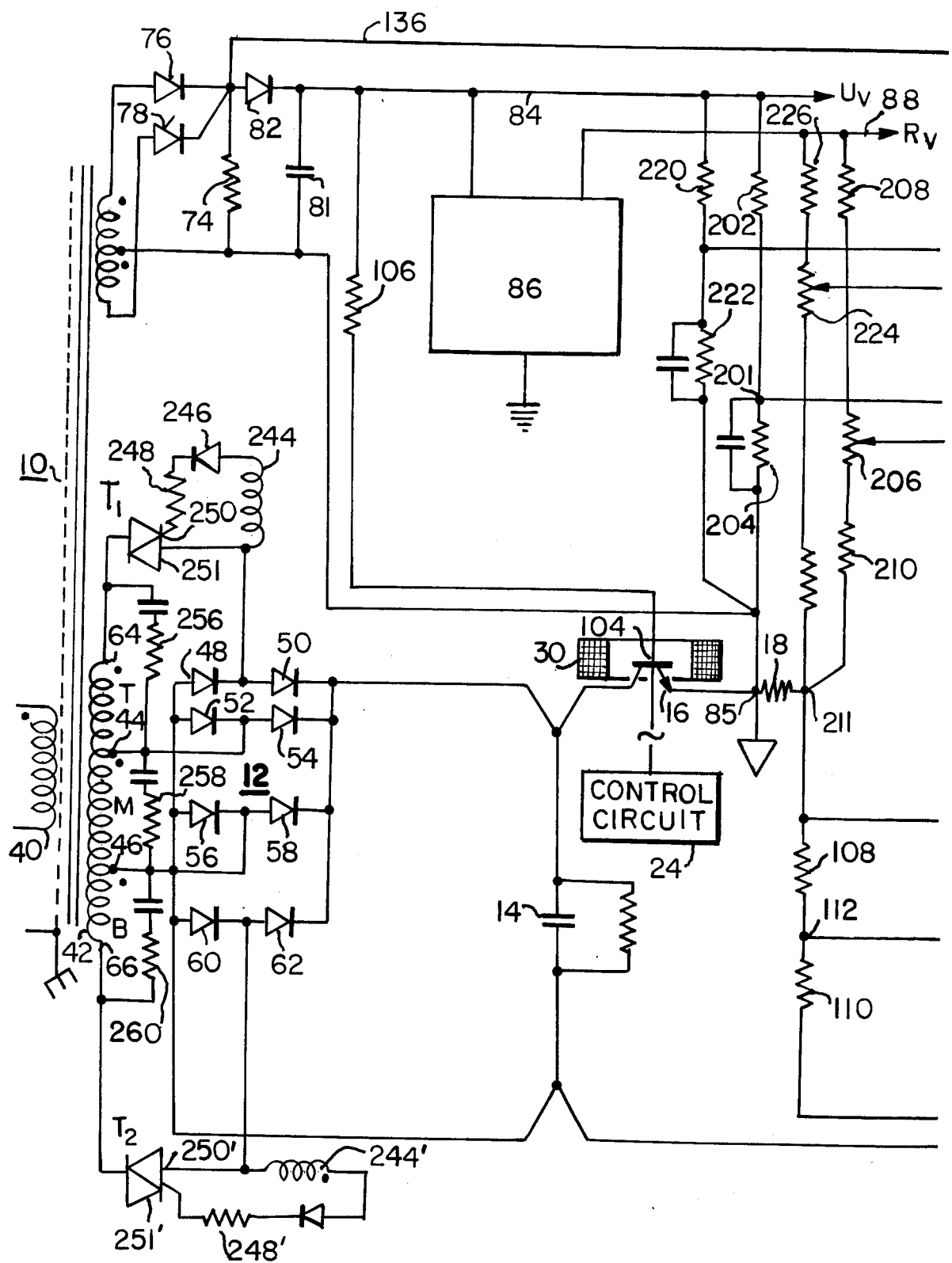
FIGS. 3A and 3B illustrate a power supply that is identical to that shown in FIGS. 1A and 1B, except that the triacs are fired with the output pulses of an electronic clock.
Figure 3B:
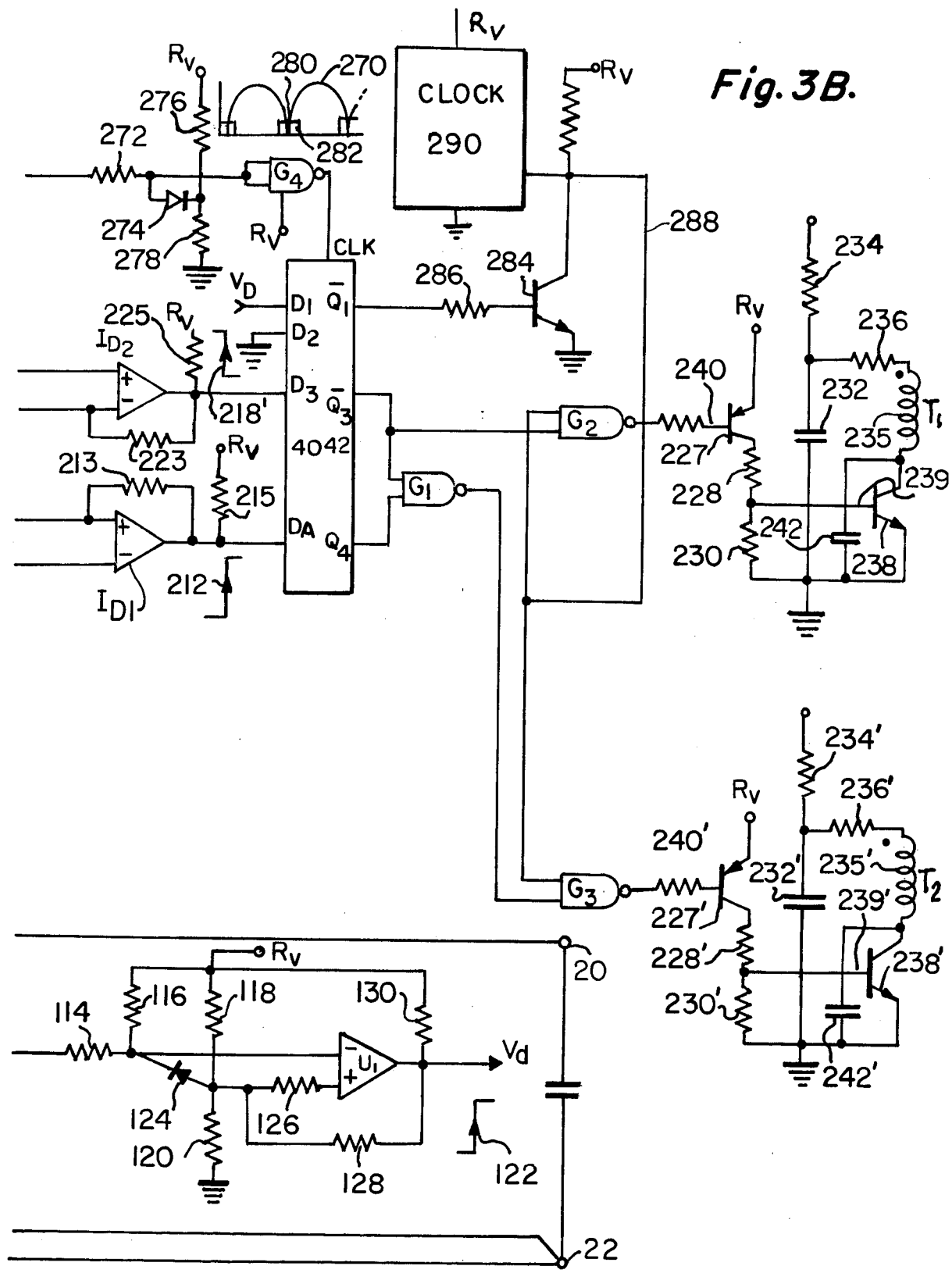

The power supply illustrated in FIGS. 3A and 3B is largely the same as that of FIGS. 1A and 1B, and therefore corresponding parts are designated by the same numerals or letters. The primary difference lies in the way the firing pulses are generated and the way the signal information relating to voltage and current is presented to the logic circuits. These changes result in the elimination of the current sink involving the transistor 244 and its associated circuit, the zero crossover circuit involving $U_2$ and $G_1$, and the monostable multivibrator 134.

A fully rectified voltage wave such as illustrated by the curve 270 is derived from the resistor 74, as in FIGS. 1A and 1B, and is applied via a current limiting resistor 222 to both inputs of a NAND gate $G_4$.

A clamping diode 274 is connected between both inputs and the junction of resistors 276 and 278 that are connected in series between a point of reference voltage $R_v$ and control circuit ground. A square wave with positive pulses 280 stradling the cusps where the rectified wave 270 reaches zero is produced at the output of $G_4$ and applied to the clock terminal CLK of an integrated latch circuit CD4042.

The inputs to the integrated circuit CD4042 $D_1$, $D_3$ and $D_4$ are respectively connected to receive the output signals delivered by $V_d$, $I_{d2}$ and $I_{d1}$. The input $D_2$ is connected to control circuit ground. During the positive pulses 280 at the clock terminal, the D inputs can vary at will without affecting the output of the latch or the firing of the triacs $T_1$ or $T_2$, but during the intervening low portions 282, the signals applied to the various inputs update the outputs and are held at the same values they had at the trailing edge of a pulse 280. The update occurs once every half cycle of the line voltage.

The logic circuits comprised of $G_1$, $G_2$ and $G_3$ receive the same information as they did in FIG. 1B and they operate in the same manner to fire the triacs $T_1$ and $T_2$. The signal 212 from $I_{d1}$ is the same as before and is translated from input $D_4$ to an output $Q_4$ which is connected to one input terminal of the NAND gate $G_1$. The signal 218' from $I_{d2}$ has the opposite polarity from what it had before because the connections of the positive and negative inputs of $U_4$ are interchanged, i.e., the positive input is connected to the junction of the resistors 220 and 222 and the negative input is connected to the tap of the potentiometer 224. However, it is again inverted at the output $Q_3$ before application to inputs of $G_1$ and $G_2$. The output signal 122 of $V_d$ is taken in inverted form from the output terminal $Q_1$ and applied to the base electrode of a transistor 284 via a base resistor 286 so as to cause the transistor 284 to conduct when the signal 122 is in its low state indicating that the output voltage is below the voltage threshold of curve 34 of FIG. 1. This short circuits the lead 288 to ground so that triac firing pulses supplied to the lead 288 from a clock 290 do not reach the inputs of $G_2$ and $G_3$.

Instead of providing a single firing pulse near the beginning of each half cycle of line voltage, as indicated in the graph 146 of FIGS. 1A, 2A, a clock 290 in the form of a free running astable multivibrator continuously provides firing pulses at a pulse repetition rate of 18KHz. No current sink is required because the appropriate triacs will be fired whenever the voltage applied to their input exceeds the voltage across the filter capacitor 14.

Alternate Embodiment of the Invention

Figure 4A:
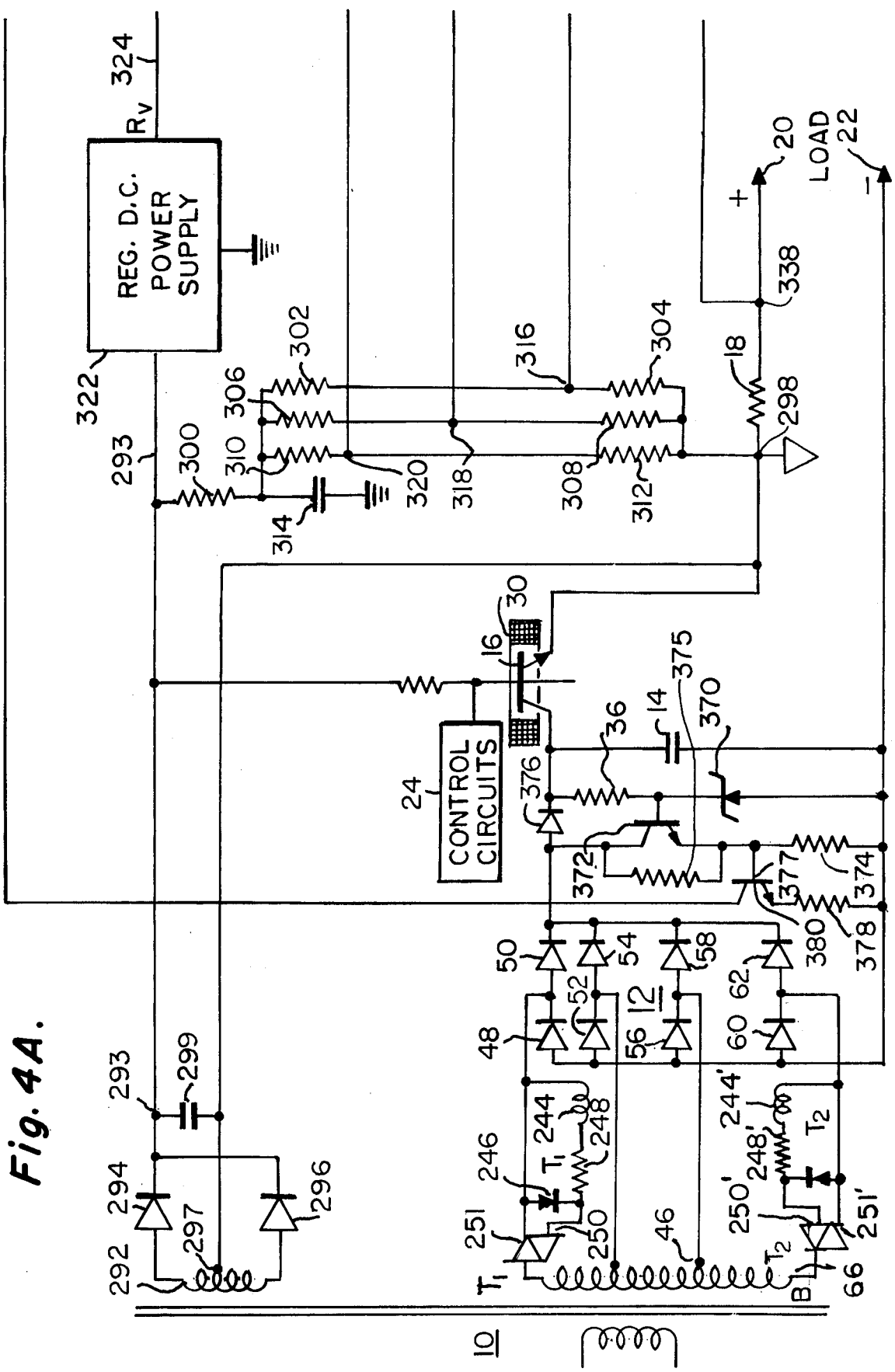
FIGS. 4A and 4B illustrate a power supply in which the changes in the turns ratio of the power transformer are effected only when the load current passes through each of three different values of load current.
Figure 4B:
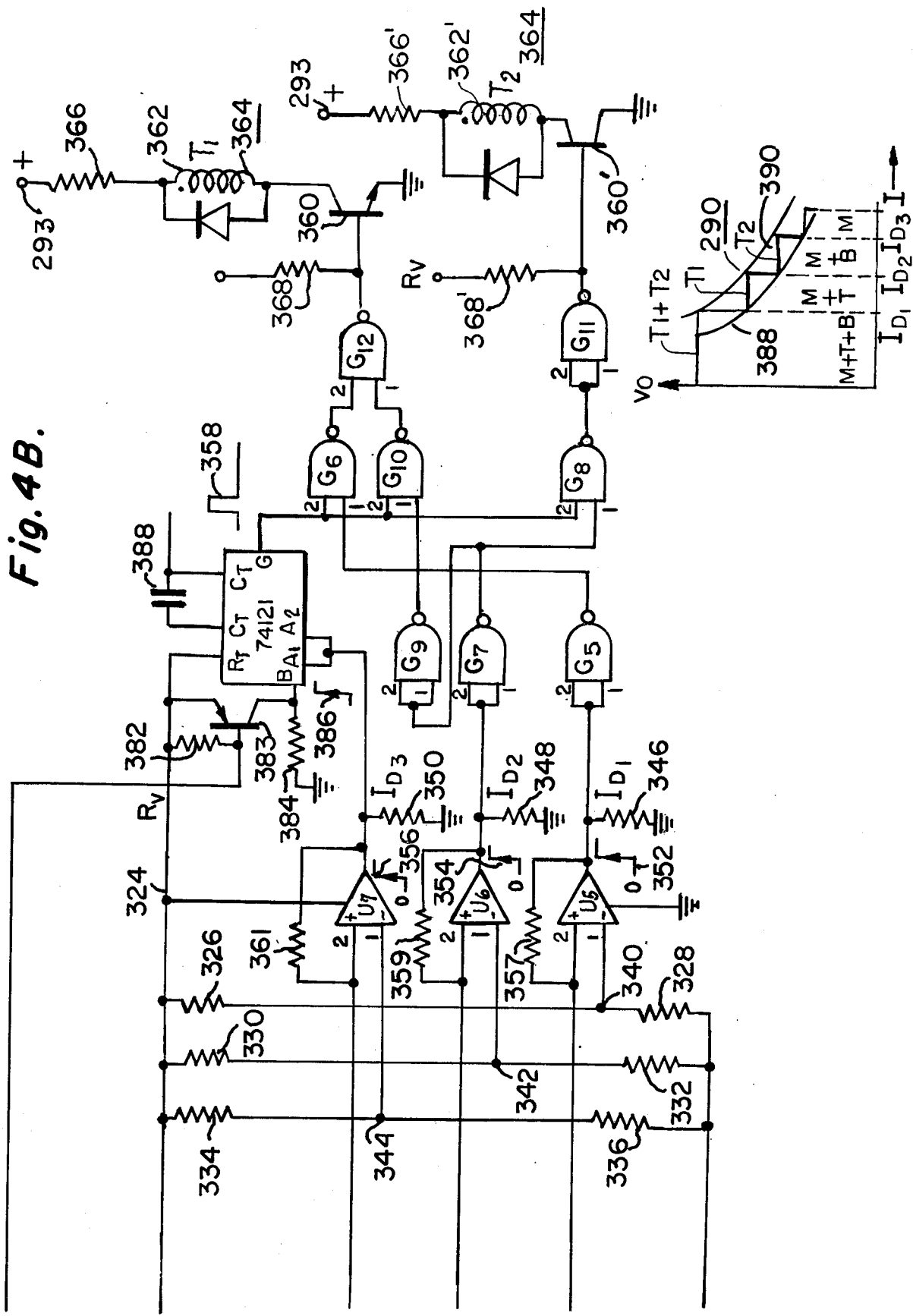

Reference is now made to FIGS. 4A, 4B that illustrate a power supply in which the voltage applied to charge the filter capacitor is determined by the load current as indicated in the Graph 290. Those components performing the same or similar functions as in FIGS. 1A and 1B are designated by the same numerals or letters.

From the Graph 290 it is seen that all of the turns of the secondary winding 46 of the power transformer 10, M+T+B are to be active until the load current reaches a value $I_{d1}$, that the sections M and B are to be active until the load current reaches a value of $I_{d2}$, that the sections M+T are to be active until a value of $I_{d3}$, and that for values greater than $I_{d3}$ only section M is to be active. In order to do this the triacs $T_1$ and $T_2$ are to be fired as indicated.

The predetermined values of the load current $I_{d1}$, $I_{d2}$, and $I_{d3}$ are to be changed inversely with the power line voltage. This is accomplished by deriving separate unregulated direct current voltges from the line and respectively applying each voltage to one input of the operational amplifers $U_5$, $U_6$ and $U_7$. Any suitable rectifying means could be used for this purpose but the one illustrated is comprised of a tertiary winding 292 having its ends coupled to a bus 293 for unregulated voltage by diodes 294 and 296, and its center tap 297 connected to control circuit common 298 at the input side of the current monitoring resistor 18. Filtering is provided by a capacitor 299 connected between the center tap 297 and the bus 293. A voltage dropping resistor 300 is connected in series with pairs of serially connected resistors 302, 304, 306, 308 and 310, 312 between the unregulated voltage bus 293 and the control circuit ground. Further filtering is provided by a capacitor 314 connected in shunt with the series pairs of resistors. By suitably proportioning the resistances of the resistors of each pair, different direct current voltages each varying with the line voltage are produced at the respective junctions 316, 318 and 320. These junctions are respectively connected to the noninverting inputs of the operational amplifiers $U_5$, $U_6$ and $U_7$.

Information as to the amplitude of the load current is provided by comparing the voltage drop it produces across the current monitoring resistor 18 with a wall regulated direct current voltage $R_r$. The latter is derived from the bus 293 of unregulated voltage by any suitable means 322 and supplied to a bus 324 of regulated voltage. Pairs of serially connected resistors 326, 328; 330, 332; and 334, 336 are connected between the bus 324 and the output end 338 of the current monitoring resistor 18. By suitably proportioning the resistors, the direct current voltage at the junctions 340, 342, and 344 of the respective resistor pairs define the current relationships of $I_{d1}$, $I_{d2}$ and $I_{d3}$ for any value of line voltage. The junctions 340, 342 and 344 are respectively connected to the inverting inputs of the operational amplifiers $U_5$, $U_6$ and $U_7$.

Although the proportioning of the resistors can be done in many ways so as to provide the necessary voltages to the noninverting and inverting inputs of the amplifiers $U_5$, $U_6$ and $U_7$, the resistors 304, 308 and 312 that are connected between the noninverting inputs and the circuit common point 301, and the resistors 328, 332 and 336 that are connected between the noninverting inputs and the output end 338 of the current monitoring resistor 18 can all have the same value in order that all inputs see nearly the same impedance. Therefore, the relative voltages representing line voltage at the junctions 316, 318 and 320 are determined by the relative values of the resistors 302, 306 and 310, and the relative voltages representing load current variations at the junctions 340, 342 and 344 are determined by the relative values of the resistors 326, 330 and 334.

When the load current is zero, the particular logic circuits require for reasons to be explained, that the amplifiers $U_5$, $U_6$ and $U_7$ produce low voltages across the corresponding pulldown resistors 346, 348 and 350 that are connected between their respective output terminals and the control circuit common point 298. Thus, in order to attain the low voltages required at the output when the load current is zero, all the inverting inputs must be more positive than the corresponding noninverting inputs.

As the load current increases, the output end 338 of the current monitoring resistor 18 becomes increasingly negative, thus reducing the voltage at the junctions 340, 342 and 344 and at the inverting inputs of the amplifiers $U_5$, $U_6$ and $U_7$, since the voltage of the bus 324 remains fixed. Line voltage variations cause corresponding variations in the voltages at the junctions 316, 318 and 320 and at the noninverting inputs of the amplifiers $U_5$, $U_6$ and $U_7$. Whenever the voltage at an inverting input of one of these amplifiers is reduced to a point below that of a noninverting input, the output goes positive from circuit common 298 to nearly the value of $R_r$, as indicated by the arrows in the waveforms 352, 354 and 356. Resistors 357, 359 and 361 are respectively connected from the outputs to the noninverting inputs of the operational amplifiers $U_5$, $U_6$ and $U_7$ in order to provide hysteresis which prevents constantly changing the firing of the triacs $T_1$ or $T_2$ when the load current equals the decision currents $I_{d1}$, $I_{d2}$ and $I_{d3}$.

In a manner to be described, positive pulses 358 are provided by a 74121 type of monostable multivibrator integrated circuit near the beginning of each half cycle of line voltage. The output of $U_7$ is applied to the negative-going edge sensitive terminals $A_1$ and $A_2$ of the circuit 74121 so as to inhibit it from producing the pulses 358 whenever the output of $U_7$ is positive. Thus, when the load current is in excess of the predetermined value of $I_3$, as adjusted by the line voltage level, no pulses 358 are produced.

The firing circuit for the triac $T_1$ is comprised of an NPN transistor 360 having its emitter connected to the control circuit common 298 and its collector connected through the primary winding 362 of a pulse transformer 364 and a current limiting resistor 366 to the unregulated positive bias voltage at 293. The secondary winding of the transformer 364 is designated by the numeral 244 as in FIG. 1A and is connected, as described in connection with FIG. 1A, to fire the triac $T_1$. This occurs whenever a positive pulse is present at the base of the transistor 360. The firing circuit for the triac $T_2$ is identical to that for the triac $T_1$ and similar components are designated by the same numerals primed. The logic circuitry which is a means for changing the voltage applied to the filter capacitor 14 as the load current passes through predetermined values that are varied in accordance with line voltage may be briefly described as follows. The output of $U_5$, the $I_{d1}$ signal, is connected to both inputs of a NAND gate $G_5$ so that it operates simply as an inverter. Its output is connected to one input of a NAND gate $G_6$, the other input being connected to the output terminal Q of the integrated circuit 74121 at which the positive going pulses 358 are present, unless they are inhibited. The output of $U_6$, the $I_{d2}$ signal, is applied to both inputs of a NAND gate $G_7$ so as to be inverted before application to an input of a NAND gate $G_8$, the other input being connected to the output terminal Q of the integrated circuit 74121. The output of $G_7$ is also applied to both inputs of NAND gate $G_9$, and its output is connected to one input of a NAND gate $G_{10}$, the other input being connected to the output terminal Q of the integrated circuit 74121.

The output of $G_8$ is applied to both inputs of NAND gate $G_{11}$ and its output is connected to the base of the transistor 360' in the firing circuit for $T_2$. A pullup resistor 368' is connected between the bus 324 of regulated voltage $R_v$ and the output of $G_{11}$. The output of $G_{10}$ is connected to one input of a NAND gate $G_{12}$ and the output of $G_6$ is connected to the other. The output of $G_{12}$ is connected to the base of the transistor 360 in the firing circuit for $T_1$. A pullup resistor 368 is connected between the output of $G_{12}$ and the bus 324 of regulated voltage $R_r$.

Although not shown, all of the integrated circuits $U_5$–$U_7$; $G_5$–$G_{12}$; and 74121 are biased between the bus 324 and the circuit common 298.

The operation of the logic circuits just described is set forth in the following table in which 0 represents a low state and 1 represents a high state. The more positive of the inverting or noninverting inputs of the operational amplifiers is indicated by ++ and the other by +.

|       | T+M+B Inputs | | Out | M+B Inputs | | Out | M+T Inputs | | Out | M Inputs | | Out |
|-------|---|---|---|---|---|---|---|---|---|---|---|---|
|       | 1 | 2 |   | 1 | 2 |   | 1 | 2 |   | 1 | 2 |   |
| $U_5$ | ++ | + | 0 | + | ++ | 1 | + | ++ | 1 | + | ++ | 1 |
| $U_6$ | ++ | + | 0 | ++ | + | 0 | + | ++ | 1 | + | ++ | 1 |
| $U_7$ | ++ | + | 0 | ++ | + | 0 | ++ | + | 0 | + | ++ | 1 |

-continued

|  | T+M+B | | | M+B | | | M+T | | | M | | |
|---|---|---|---|---|---|---|---|---|---|---|---|---|
|  | Inputs | | Out | Inputs | | Out | Inputs | | Out | Inputs | | Out |
| $G_5$ | 0 | 0 | 1 | 1 | 1 | 0 | 1 | 1 | 0 | 1 | 1 | 0 |
| $G_7$ | 0 | 0 | 1 | 0 | 0 | 1 | 1 | 1 | 0 | 1 | 1 | 0 |
| $G_9$ | 1 | 1 | 0 | 1 | 1 | 0 | 0 | 0 | 1 | 0 | 0 | 1 |
| $G_8$ | 1 | 1 | 0 | 1 | 1 | 0 | 0 | 1 | 1 | 0 | 0 | 1 |
| $G_{10}$ | 0 | 1 | 1 | 0 | 1 | 1 | 1 | 1 | 0 | 1 | 0 | 1 |
| $G_6$ | 1 | 1 | 0 | 0 | 0 | 1 | 0 | 1 | 1 | 0 | 0 | 1 |
| $G_{11}$ | 0 | 0 | $(1)T_2$ | 0 | 0 | $(1)T_2$ | 1 | 1 | 0 | 1 | 1 | 0 |
| $G_{12}$ | 1 | 0 | $(1)T_1$ | 1 | 1 | 0 | 0 | 1 | $(1)T_1$ | 1 | 1 | 0 |

In view of the fact that only one pulse is to be provided during each half cycle, a current sink is provided for the triacs $T_1$ and $T_2$ for the same reasons as set forhh in connection with FIGS. 1A and 1B. In FIG. 4A, however, it is comprised of a resistor 369 and a zener diode 370 connected in series across the filter capacitor 14. The collector of an NPN transistor 372 is connected to the positive side of the rectifying system 12 and its emitter is connected to the other side via a resistor 374. The base of the transistor 372 is connected to the junction of the resistor 369 and the zener diode 370. Current flows through the collector emitter path of the transistor 372 and power sharing resistor 375 until the sum of its base-emitter voltage and the voltage drop across the resistor 374 equals the voltage across the zener diode 370. Thus, a current path or sink is provided for current flowing through the triacs $T_1$ and $T_2$ before it can flow into the filter capacitor 14. A diode 376 is connected between the collector of the transistor 372 and the positive side of the capacitor 14 to prevent it from discharging through the current sink just described.

The timing of the triac firing pulse 358 near the beginning of each half cycle of the line voltage is achieved by the following circuit. A resistor 378, the emitter-collector path of an NPN transistor 380 and a resistor 382 are connected in series between the negative output terminal 22, and the bus 324 of regulated voltage $R_r$. The base of the transistor 380 is connected to the junction of the emitter of the transistor 372 and the resistor 374 and, thus, when sink current starts flowing through the resistor 374, the base of the transistor 380 is biased so that current flows through the transistor 380 and the resistor 382. Th emitter-collector path of a PNP transistor 383 and a load resistor 384 are connected in series between the bus 324 and control circuit common 298. The base of the transistor 383 is connected to one end of the resistor 382. When the transistor 380 conducts, transistor 383 conducts producing, as indicated at 386, a positive-going voltage across the resistor 384. This voltage is applied to the positive-going edge sensitive terminal B of the integrated circuit 74121 so as to cause it to produce a pulse 358 at its output terminal Q. The duration of the pulse is determined by an internal timing resistance and an external capacitor 388 connected between C and $C_t$. Connection of the negative-going edge sensitive terminals $A_1$ and $A_2$ to the output of $U_7$ inhibits the integrated circuit 74121 from producing the firing pulses 358 whenever the output of $U_7$ is high, thus indicating that the load current is greater than the value of $I_{d3}$ for the existing line voltage level.

The circuits of FIGS. 4A, 4B permit the power transformer to be designed for more nearly constant power output for the reason that as the load current increases from $I_{d1}$ to $I_{d2}$ to $I_{d2}$, the heat loss in the transformer 10 is kept nearly constant by reducing the number of turns of the secondary winding 46 of the power transformer 44 that are active. By proper selection of the load currents $I_{d1}$, $I_{d2}$ and $I_{d3}$ the rated output of the supply can be along a portion of a constant power curve 388, as shown in the graph 290. However, the required heat dissipation capacity of the heat sink 30, illustrated by the curve 390, must be greater than it would be if means were provided for changing the voltage applied to the filter capacitor 14 when the output voltage is above a threshold value such as was the case with the power supplies of FIGS. 1A, 1B and FIGS. 3A, 3B. Thus, the voltage applied to the capacitor 14 was increased whenever the output voltage went above the threshold indicated by the curve 34.

What is claimed is:

1. Apparatus for providing selected levels of direct current voltage from a source of alternating current voltage comprising in combination a transformer having primary and secondary windings, a plurality of pairs of unilateral current conducting devices, the devices of each pair being connected in series with like polarity, means connecting said series pairs in parallel with like polarity, a direct current connection between a first intermediate tap on said secondary winding and a junction of a first of said pairs of said devices, a direct current connection between a econd intermediate tap on said secondary winding and the junction between a second pair of said devices, a first switch connected between a first point on said secondary winding that is on one side of said intermediate taps and the junction between a third pair of said devices, and a second switch connected between a second point on said secondary winding that is on the other side of said intermediate taps and the junction between a fourth pair of said devices.

2. Apparatus as set forth in claim 1 wherein the number of turns of said secondary winding between said first and second taps, between said first tap and said first point, and between said second tap and said second point are all different.

3. In a power supply for providing direct current output voltage from a source of alternating current voltage, the combination of rectifying means coupled to said source so as to produce a direct current voltage at its output, a filter capacitor coupled to said output so as to be charged therefrom, a pair of power supply output terminals, a voltage regulator coupled with said filter capacitor and said output terminals, control circuits for maintaining a preset value of constant voltage or constant current between said output terminals by application of a suitable voltage to said regulator, means for providing a control signal that is indicative of the amplitude of any load current that flows beween said output terminals, and means responsive to the value of said control signal at the beginning of each half cycle of alternating current voltage to set the direct current voltage produced by said rectifying means for the duration of that half cycle at a first level when said load current is below a predetermined value and at level lower than said first level when aid load current is above said predetermined value.

4. Apparatus as set forth in claim 3 wherein said last mentioned means changes the direct current voltage supplied by said rectifying means from one discrete level to another in response to the passing of said control signal through a predetermined value corresponding to a predetermined value of load current.

5. The combination as set forth in claim 4 wherein means are provided for changing said predetermined value of said control signal inversely with the amplitude of the voltage from said source of alternating current voltage.

6. The combination as set forth in claim 3 wherein voltage decision means are provided for preventing said control signal from being applied to said means for controlling the direct current voltage at the output of said rectifying means until the direct current voltage across said power supply output terminals reaches a predetermined threshold amplitude.

7. The combination as set forth in claim 4 wherein voltage decision means are provided for preventing said control signal from being applied to said means for controlling the direct current voltage at the output of said rectifying means until the direct current voltage across said power supply output terminals reaches a predetermined threshold amplitude.

8. The combination as set forth in claim 5 wherein voltage decision means are provided for preventing said control signal from being applied to said means for controlling the direct current voltage at the output of said rectifying means until the direct current voltage across said power supply output terminals reaches a predetermined threshold amplitude.

9. The combination as set forth in claim 6 wherein means are provided for reducing, as the load current increases, the predetermined threshold amplitude at which said volage decision means permits the application of the control signals to said controlling means for said rectifier.

10. The combination as set forth in claim 7 wherein means are provided for reducing, as the load current increases, the predetermined threshold amplitude at which said voltage decision means permits the application of the control signals to said controlling means for said rectifier.

11. The combination as set forth in claim 8 wherein means are provided for reducing, as the load current increases, the predetermined threshold amplitude at which said voltage decision means permits the application of the control signals to said controlling means for said rectifier.

12. A direct current power supply comprising in combination a power transformer having primary and secondary windings, rectifying means coupled to said secondary winding so as to provide a direct current charging voltage, a filter capacitor coupled to said rectifying means so as to be charged therefrom, a regulator coupled to said capacitor, and a current monitoring resistor connected between one side of said capacitor and an output terminal of said power supply, another output terminal of said power supply connected to the other side of said filter capacitor, control circuits for maintaining a preset value of constant voltage or constant current between said power supply output terminals by application of a suitable voltage to said regulator, means coupled to said transformer windings for providing a direct current line compensation control voltage that varies with the amplitude of any alternating current voltage that may be applied to said primary winding, a voltage comparator having two inputs and an output, a first input being coupled to said means for providing said line compensation control voltage and a second input coupled to said current monitoring resistor so that the voltage at said second input varies with the voltage drop produced across said current monitoring resistor as a result of load current flowing therethrough, said voltage comparator producing a first voltage level at its output when the voltage at said first input is greater than the voltage at said second input and a second voltage level at its output when the voltage at said first input is less than the voltage at said second input, and means for setting the amplitude of said direct current charging voltage at one value when the output of said voltage comparator is at said first voltage level and at a different value when the output of said comparator is at said second voltage level.

13. A direct current power supply as set forth in claim 12, wherein means are provided for maintaining said charging voltage at its lowest value when the output voltage of said supply is less than a given threshold value.

14. A direct current power supply as set forth in claim 13 wherein said threshold value decreases with load current.

15. A direct current power supply as set forth in claim 13, wherein means are provided for making said means for setting the amplitude of said charging voltage capable of changing said charging voltage to a different amplitude once each half cycle of the alternating current voltage applied to said primary winding.

16. In a direct current power supply apparatus comprising in combination a power transformer having primary and secondary windings, a plurality of pairs of unilateral current conducting devices, the devices of each pair being connected in series with like polarity, means connecting said series pairs in parallel with like polarity, a direct current connection between a first intermediate tap on said secondary winding and a junction of a first of said pairs of devices, a direct current connection between a second intermediate tap on said secondary winding and the junction between a second pair of said devices, a first switch connected between a point on said secondary winding that is on one side of said intermediate taps and the junction between a third pair of said devices, a second switch connected between a point on said secondary winding that is on the other side of said intermediate taps and the junction between a fourth pair of said devices, a filter capacitor connected in parallel with said pairs of unilateral current conducting devices, first and second output terminals for said power supply, a regulator, and a current monitoring resistor connected in series between one side of said filter capacitor and said first output terminal, the end of said current monitoring resistor near said filter capacitor being termed control circuit common, a direct current connection between the other side of said filter capacitor and said second output terminal, switch control means responsive to the voltage drop produced in said current monitoring resistor by load current flowing therethrough to: close both said switches if said load current is less than a first predtermined decision value; close only one of said switches if said load current is greater than said first predetermined decision value but less than a second predetermined decision value; closing only the other of said switches if the load current is greater than said second predetermined decision value, and means for varying said first and second predetermined current decision values inversely with the amplitude of any alternating current voltage applied to the primary winding of said transformer.

17. In a power supply as set forth in claim 16, means for preventing the closure of either switch in response to a voltage between said output terminals that is less than a given value.

18. In a power supply as set forth in claim 16, means for rendering said switch control means operative to change the combination of said first and second switches to be closed once during each half cycle of the alternating current voltage applied to said primary winding.

19. In a power supply as set forth in claim 18, means for preventing the closure of either switch in response to a voltage between said output terminals that is less than a given value.

20. In a power supply the combination of rectifying means for selectively providing different discrete direct current voltages from a source of alternating current voltage, a pair of output terminals, a regulator connected between said means and said output terminals, control circuits coupled to said regulator for maintaining a preset value of constant voltage or current between said output terminals, means for providing a first signal that varies with the amplitude of an alternating current voltage provided by said source, means for providing a second signal that varies with any current flowing between said regulator and said output terminals, control means responsive to said first and second signals for causing said rectifying means to provide one direct current voltage for the duration of each half cycle of the alternating current voltage when the current flowing between regulator and said output terminals is below a given value at the beginning of the half cycle and for causing said rectifying means to provide a smaller direct current voltage for the duration of each half cycle of the alternating current voltage when the current flowing between the regulator and the output terminals exceeds the given value at the beginning of the half cycle, said latter means being such that the given value of current at which the aforesaid changes in direct current voltage are effected vary inversely with the amplitude of the alternating current voltage supplied by said source, and means for preventing said control means from causing said rectifying means to provide a greater direct current voltage when the voltage between said output terminals is less than a predetermined value.

* * * * *

UNITED STATES PATENT AND TRADEMARK OFFICE
CERTIFICATE OF CORRECTION

PATENT NO. : 4,061,958
DATED : December 6, 1977
INVENTOR(S) : William T. Walker

It is certified that error appears in the above-identified patent and that said Letters Patent are hereby corrected as shown below:

| | | |
|---|---|---|
| Column 1 | line 22 | "$V_r I_r$" should read -- $v_r$, $I_r$. -- |
| Column 2 | line 6 | "traic" should read -- triac -- |
| Column 3 | line 4 | "limitaions" should read -- limitations -- |
| Column 4 | line 27 | "80" should read -- 81 -- |
| Column 5 | line 48 | "at" should read -- of --; "of" should read -- at -- |
| Column 5 | line 64 | "$V_d$" should read -- $V_D$ -- |
| Column 6 | line 57 | "ings as active" should read -- ings active -- |
| Column 8 | line 48 | "minimize the" should read -- minimize any -- |
| Column 10 | line 27 | "is in the" should read -- is the -- |
| Column 12 | line 8 | "$Q_1$" should read -- $\overline{Q}_1$ -- |
| Column 12 | line 47 | "voltges" should read -- voltages -- |
| Column 15 | line 13 | "forhh" should read -- forth -- |

UNITED STATES PATENT AND TRADEMARK OFFICE
CERTIFICATE OF CORRECTION

PATENT NO. : 4,061,958
DATED : December 6, 1977
INVENTOR(S) : William T. Walker

It is certified that error appears in the above-identified patent and that said Letters Patent are hereby corrected as shown below:

Column 15   line 64   "$I_{d1}$ to $I_{d2}$ to $I_{d2}$" should read -- $I_{d1}$ to $I_{d2}$ --

Column 16   line 35   "econd" should read -- second --

Column 17   line 1    "aid" should read -- said --

Column 17   line 39   "volage" should read -- voltage --

Column 20   line 10   "between regulator" should read -- between said regulator --

Column 20   line 14   "voltage" should read -- voltages --

Signed and Sealed this

Thirteenth Day of June 1978

[SEAL]

Attest:

RUTH C. MASON
*Attesting Officer*

DONALD W. BANNER
*Commissioner of Patents and Trademarks*